US008133522B1

(12) United States Patent
Valentine et al.

(10) Patent No.: US 8,133,522 B1
(45) Date of Patent: Mar. 13, 2012

(54) FUNCTIONAL MILK PRODUCTS AND METHOD FOR MAKING

(75) Inventors: William Valentine, Lawrenceville, GA (US); William K Valentine, Lawrenceville, GA (US)

(73) Assignee: Advanced Technology Pharmaceuticals Corporation, Dacula, GA (US)

( * ) Notice: Subject to any disclaimer, the term of this patent is extended or adjusted under 35 U.S.C. 154(b) by 1547 days.

(21) Appl. No.: 10/135,917

(22) Filed: Apr. 29, 2002

(51) Int. Cl.
 *A23C 9/154* (2006.01)
(52) U.S. Cl. .................................. 426/580; 426/573
(58) Field of Classification Search .............. 426/72, 426/573, 580, 587
 See application file for complete search history.

(56) References Cited

U.S. PATENT DOCUMENTS

| | | | |
|---|---|---|---|
| 2,568,369 A * | 9/1951 | Scholz | 426/576 |
| 4,081,567 A | 3/1978 | Haber | |
| 4,237,118 A | 12/1980 | Howard | |
| 4,701,329 A | 10/1987 | Nelson et al. | |
| 4,803,087 A | 2/1989 | Karinen | |
| 5,063,074 A | 11/1991 | Kahn et al. | |
| 5,387,427 A | 2/1995 | Lawrence et al. | |
| 5,558,897 A | 9/1996 | Goldman | |
| 6,455,082 B1 * | 9/2002 | Sher et al. | 426/74 |

OTHER PUBLICATIONS

King's American Dispensatory, 1898: Acacia (U.S.P.).*
Wong, N.P. ed., Fundamentals of Dairy Chemistry, Third Edition, 1988, Van Nostrand Reinhold Company, New York, pp. 55, 56, and 760-762.*

* cited by examiner

*Primary Examiner* — Leslie Wong
(74) *Attorney, Agent, or Firm* — DeLio & Peterson, LLC

(57) ABSTRACT

The present invention relates to functional milk products containing gum acacia as a fiber source and organoleptic attribute enhancer without any discernable after taste. The preferred milk used in the practice of this invention is super-skimmed milk that has had essentially all of the fats removed via ultra-centrifugation or reconstituted non-fat dried milk prepared from the super-skimmed milk. The gum acacia is used in amounts sufficient to provide a good source of dietary fiber without adversely affecting the organoleptic properties of the milk. Flavorants, vitamins and/or minerals may be added to the functional milk product for special consumer products.

3 Claims, No Drawings

FUNCTIONAL MILK PRODUCTS AND METHOD FOR MAKING

BACKGROUND OF THE INVENTION

1. Field of the Invention

The present invention relates to functional milk products containing fiber with enhanced organoleptic properties.

2. Description of Related Art

Milk is one of the most important food products known and used by people of all ages as a beverage, to make other food products and other such food uses. Milk is a heterogeneous liquid secreted by the mammary gland and composed (for cows' milk) of approximately 87% water, 3.8% emulsified particles of fat and fatty acids, 3% casein, 5% sugar (lactose), serum proteins, calcium, phosphorus, potassium, iron, magnesium, copper, and several vitamins.

Over the years, milk has been modified to make it more commercially acceptable for a wider variety of people with a major emphasis being on reducing the fat content of the milk to make a product such as skim milk or 1% fat milk. Such modified products are needed by different classes of consumers for different purposes and there is a large market for such modified milk. Unfortunately, modified milk does not have the overall organoleptic properties of regular or whole milk and their acceptance has not been met with great consumer satisfaction.

The need exists to enhance the consumer acceptance of milk, including defatted liquid milk, since there is a strong commercial desire to have milk serve as the base for a series of enhanced nutritional functional foods such as milk plus lactase enzyme, milk plus bacteria and milk plus fiber, vitamins and minerals. Fiber is also important in the diet and it is highly desirable to provide a functional milk product having wide consumer acceptance and nutritional fiber containing properties. In order for any fiber to be considered for use in milk, however, the resultant milk product must have acceptable and preferably enhanced organoleptic properties such as mouthfeel, creaminess and no discernable after taste.

U.S. Pat. No. 5,558,897 issued to Goldman shows the use of hydrolyzed guar gum as the soluble fiber source for addition to milk. The Goldman patent specifically discloses the use of enzymatically hydrolyzed guar gum at a maximum use level of about 5 grams of fiber per 8 ounces of milk (about 0.0205 weight %).

A calcium-fortified milk is shown in U.S. Pat. No. 4,701,329 to Nelson et al. containing a finely divided calcium compound and a mixture of carrageenan gum and guar gum in hydrated form as calcium suspension stabilizers.

U.S. Pat. No. 5,063,074 to Kahn et al. shows a low fat low cholesterol milk containing a non-tropical vegetable oil, food grade gum, flavoring agent and a non-lauric emulsifier.

Bearing in mind the problems and deficiencies of the prior art, it is therefore an object of the present invention to provide a functional milk product containing fiber and having commercially acceptable organoleptic properties such as mouthfeel, creaminess and with no discernable after taste.

It is another object of the present invention to provide a functional milk product containing fiber in a quantity sufficient to effect meaningful fiber concentrations in a typical 8 ounce serving size.

A further object of the invention is to a method for making a functional milk product that contains fiber and has commercially acceptable organoleptic properties and further contains vitamins and/or minerals and, if desired, additional flavorants, sweeteners, enzymes, or proteins.

Still other objects and advantages of the invention will in part be obvious and will in part be apparent from the specification.

SUMMARY OF THE INVENTION

The above and other objects, which will be apparent to those skilled in the art, are achieved in the present invention which is directed to a functional milk product containing fiber and having commercially acceptable organoleptic properties consisting essentially of milk and an effective amount of gum acacia. The present invention provides a milk based, stable, functional food combinate consisting essentially of milk and gum acacia as a soluble dietary fiber at levels of up to about 10% w/v or more. It has been found that gum acacia, when present in the milk based functional milk product, enhances the taste, mouthfeel, creaminess and other organoleptic attributes of the milk product without any discernable after taste. Additionally the gum acacia of the present invention is present in an amount sufficient to provide a meaningful contribution to the daily nutritional requirement for fiber. Amounts of fiber up to 24 grams per 8 ounces, or more, can be made without any discernable after taste. Amounts of gum acacia up to about 10% w/v, or more, may be employed for specific purposes and it is preferred that gum acacia be used in amounts of about 0.01-10% w/v and more, preferably about 0.4-10% w/v, typically 1 to 5%. Additives such as vitamins and/or minerals can also be used in the milk-fiber product for specific purposes.

In the practice of the invention, the milk used can be any liquid or rehydrated dry milk including skim milk, 0.1% low fat skim milk, 0.5% low fat skim milk, 1.0% low fat skim milk, 2% low fat skim milk, whole milk, lactose reduced milks, cultured milks, milk produced from rehydrated dried milk powder which will often provide a milk of less than 0.1% fat, and the like.

In a further aspect of the invention, a method is provided to make the milk product of the present invention comprising the following steps:

mixing together milk, and up to about 10% w/v of gum acacia to form a milk based product;

homogenizing the milk based product;

pasteurizing the homogenized milk based product; and cooling and filling the milk based product into containers.

In another aspect of the invention additives such as vitamins and minerals may be added to the milk product of the present invention. These additives are preferably added after the homogenizing, pasteurizing and cooling steps. Additives will typically require mixing (homogenizing step) to form a uniform mixture. Heating should be avoided to minimize degradation of the additives, particularly the vitamins.

DESCRIPTION OF THE PREFERRED EMBODIMENT(S)

Adding gum acacia (i.e., Gum Arabic) to milk in effective nutritional amounts provides a functional food product that contains both milk and a meaningful quantity of soluble fiber as a nutritional supplement. Soluble gums such as hydrolyzed guar gum as disclosed in Goldman, supra, have been used in milk but the adverse taste and cost aspects of such a combination have kept the product from broad based acceptance. Gum acacia has been found to enhance the organoleptic qualities of the milk including the mouth feel which are essential for consumer acceptance of a milk product plus also providing a soluble fiber containing functional milk product. Gum acacia has been found to have the additional ability to retexturize defatted milk to the mouth feel, creaminess and opacity of fatted milk.

Gum acacia is well-known and is a non-toxic, highly water soluble, complex, acidic, high molecular weight heteropolysaccharide. The gum acacia polymer is a highly branched anionic polysaccharide consisting of three fractions: an arabinogalactan complex; an arabinogalactan-protein complex; and a glycoprotein fraction. Gum acacia exists as a slightly acidic salt of complex polysaccharides which contain calcium, magnesium, sodium, and potassium ions. The gum is available commercially in the form of white or off-white to yellowish flakes, granules, or powder. Gum acacia is harvested as a dried gummy exudates from the stems and branches of acacia Senegal (linne) willdenow or of related species of acacia (family leguminoseae).

Aqueous solutions of gum acacia with concentrations of up to 40 g/100 ml can readily be prepared and solutions up to 25 g/100 ml are relatively low in viscosity. Additions of up to 10% w/v of gum acacia, or more, to milk can be achieved with no discernable after taste nor any discernable increase in viscosity and has been found to enhance the organoleptic properties of the milk.

The term milk, as contemplated by this invention, is intended to include all types of milk and milk products, such as 0.0% fat skim milk, 0.5% low fat skimmed milk, 1% low fat skimmed milk, 2% low fat skimmed milk, whole milk, lactose reduced milk, cholesterol reduced milk, any of a variety of rehyhdrated milks from milk powder, or any of a variety of cultured milks and mixtures thereof. Cultured milks include acidophilus milk, butter milk and yogurt. The invention additionally contemplates the inclusion of natural flavorants, vitamins and minerals as well as the gum acacia soluble fiber.

Any of the typical vitamins and minerals may be added to the milk product.

EXAMPLES

The following illustrative examples are presented to more particularly illustrate the specific details of the practice of the present invention. Equivalent procedures and quantities will occur to those skilled in the art and, therefore, the following examples are not meant to define the limits of the present invention, these being defined by the appended claims. All reference to percentages in the examples, as throughout the specification, are to weight percentages, unless otherwise identified.

Example 1

50 gallons of super skimmed milk, (approximately 0% fat, and 0% cholesterol) obtained via ultra centrifugation, were charged into a stainless steel tank and 41.7 pounds of gum acacia were added. The milk was agitated for a period of 20 minutes and when the gum acacia was completely dissolved, natural milk flavorants were added followed by an additional 10 minutes of mixing. The gum acacia and flavorant containing milk was then homogenized using a Manton Gaulin homogenizer at a pressure of 1800 pounds per square inch (psi), pasteurized at a temperature of 170° F. for 15 seconds and rapidly cooled to 40° F. and filled into ½ gallon jugs. The resultant gum acacia containing milk was white, opaque and organoleptically preferred to standard skim milk. Chemical analysis showed a fiber level of 24 grams of fiber in each 8 ounces (240 ml) serving.

Example 2

50 gallons of super skimmed milk were charged into a stainless steel tank and 20.9 pounds of gum acacia were added followed by agitation for a period of 20 minutes. Natural milk flavorants were added followed by an additional 10 minutes of mixing. The gum acacia and flavorant containing milk was then homogenized, pasteurized, cooled to 40° F. and filled into ½ gallon jugs as in Example 1. The resultant gum acacia containing milk was white, opaque and organoleptically preferred to commercial skim milk. Chemical analysis showed that the milk contained 12 gms of fiber in each 8 ounce (240 ml) serving size.

Example 3

50 gallons of super skimmed milk were charged into a stainless steel tank. 5.3 pounds of gum acacia was added to the milk followed by mechanical agitation for a period of 20 minutes. Natural milk flavors were added followed by an additional 10 minutes of mixing. The gum acacia and flavorant containing milk was then homogenized, pasteurized, cooled to 40° F., and filled into ½ gallon jugs as in Example 1. The resultant gum acacia containing fat free milk was white, opaque and organoleptically preferred to standard commercial skim milk. Chemical analysis showed that the milk contained 3 grams of fiber in each 8 ounce (250 ml) serving size.

Example 4

50 gallons of super skimmed milk were charged into a stainless steel tank. 1.8 pounds of gum acacia were added followed by mechanical agitation for a period of 20 minutes. Natural milk flavorants were added and the mixture agitated for an additional 10 minutes. The milk was then homogenized, pasteurized, cooled and filled into ½ gallon jugs as in Example 1. The resultant fat free gum acacia containing super skimmed milk was white, opaque, and organoleptically preferred to commercial skim milk. Chemical analysis showed that the fiber milk contained 1 gram of dietary fiber per 8 ounce (250 ml) serving size.

Example 5

50 gallons of milk that had been skimmed to a fat content of about no was charged into a stainless steel tank. 5.3 pounds of gum acacia were added followed by mechanical agitation for a period of 20 minutes. Natural milk flavorants were added and agitation continued for an additional 10 minutes. The milk was then homogenized, pasteurized, cooled and filled into ½ gallon jugs as in Example 1. The resultant gum acacia enriched 2% fat content milk was white, opaque, and organoleptically preferred to standard commercial 2% milk. Chemical analysis showed that the fiber enriched 2% milk contained 3 grams of fiber per 8 ounce (250 ml) serving size.

Example 6

A 5 gallon sample of the finished gum acacia milk product of Example 4 was charged into a stainless steel tank. Sufficient quantities of a commercially available vitamin mix were added to the tank containing the milk and the fortified milk vitamin blend was stirred for 20 minutes The finished milk, gum acacia, vitamin product contained 1 gram of fiber in each 8 oz serving size plus Vitamin A 1250 IU, Vitamin D 100 IU, Vitamin E 7.5 IU, Vitamin K 20 micrograms, ascorbic acid C 20 mg, thiamin mononitrate 0.4 mg, riboflavin 0.5 mg, niacin 5 mg, pyridoxine HCl 0.5 mg, folic acid 100 mcg, cyanocobalamin 1.5 mcg, and pantothenic acid 2.5 mg.

In blind taste tests no one could differentiate between the gum acacia containing milk of Example 4 and the vitamin fortified gum acacia containing milk.

2 gallons of the vitamin fortified gum acacia containing milk were further enriched with a mineral blend and rehomogenized so that each 8 ounce serving size contained calcium 100 mg, zinc 4 mg, and magnesium 100 mg.

In blind taste tests, no one could differentiate between the gum acacia containing milk of Example 4 and the vitamin fortified gum acacia containing milk and the vitamin and mineral fortified gum acacia containing milk of this example.

Example 7

A stainless steel tank was charged with 41.635 pounds of non fat dried milk, 1.8 pounds of gum acacia, a sufficient quantity of natural milk flavorants and a sufficient amount of deionized potable water were added to produce a final volume of 50 gallons. The mixture was mixed for 25 minutes. The finished milk and gum acacia product contained 1 gram of fiber in each 8 oz. serving. The gum acacia containing milk product was homogenized, pasteurized and cooled to 40° F. as in Example 1. In blind taste tests, no discernable differences were reported between this gum acacia containing milk product and the gum acacia containing milk product of Example 4.

Example 8

A five gallon sample of the finished milk product of Example 7 containing non fat dried milk and gum acacia was charged into a stainless steel tank. Sufficient quantities of a commercially available vitamin mix were added to the tank containing the milk, and the gum acacia product enriched with the milk and vitamin blend was stirred for 20 minutes. The finished milk, gum acacia and vitamin milk product contained 1 gram of fiber in each 8 ounce serving size plus Vitamin A 1250 IU, Vitamin D 100 IU, Vitamin E 7.5 IU, Vitamin K 20 micrograms, ascorbic acid 20 mg, thiamin mononitrate 0.4 mg, riboflavin 0.5 mg, niacin 5 mg, pyridoxine HCl 0.5 mg, folic acid 100 micrograms, cyanocobalamin 1.5 micrograms, and pantothenic acid 2.5 mg. 2 gallons of the above described milk product containing gum acacia and vitamins were further enriched with a mineral blend and rehomogenized so that each 8 ounce serving size additionally contained calcium 100 mg, zinc 4 mg, and magnesium 100 mg.

In blind taste tests, no one could differentiate between the milk with gum acacia product of Example 7, the milk with gum acacia and vitamins and the milk with gum acacia, vitamins and minerals of this example.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A functional milk product containing 0% fat and having acceptable organoleptic properties consisting essentially of milk added to the product as super skimmed milk containing 0% fat and gum acacia in an amount of about 1.25%-10% w/v of the milk product.

2. The functional milk product of claim 1 which further contains natural milk flavorants.

3. The functional milk product of claim 2 which further contains vitamins and minerals.

\* \* \* \* \*

UNITED STATES PATENT AND TRADEMARK OFFICE
CERTIFICATE OF CORRECTION

| | | |
|---|---|---|
| PATENT NO. | : 8,133,522 B1 | Page 1 of 1 |
| APPLICATION NO. | : 10/135917 | |
| DATED | : March 13, 2012 | |
| INVENTOR(S) | : Valentine et al. | |

It is certified that error appears in the above-identified patent and that said Letters Patent is hereby corrected as shown below:

At column 4, line 44, delete "no" and substitute therefor -- 2% --.

Signed and Sealed this
Nineteenth Day of June, 2012

David J. Kappos
*Director of the United States Patent and Trademark Office*